(12) United States Patent
Jeddeloh

(10) Patent No.: US 6,742,074 B2
(45) Date of Patent: *May 25, 2004

(54) BUS TO SYSTEM MEMORY DELAYED READ PROCESSING

(75) Inventor: Joseph M. Jeddeloh, Minneapolis, MN (US)

(73) Assignee: Micron Technology, Inc., Boise, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/386,808

(22) Filed: Aug. 31, 1999

(65) Prior Publication Data

US 2003/0084223 A1 May 1, 2003

(51) Int. Cl.[7] .............................. G06F 13/36
(52) U.S. Cl. .................... 710/309; 710/310
(58) Field of Search ............... 710/305–315

(56) References Cited

U.S. PATENT DOCUMENTS

| | | | | |
|---|---|---|---|---|
| 5,471,590 A | * | 11/1995 | Melo et al. | 710/108 |
| 5,764,929 A | * | 6/1998 | Kelley et al. | 710/100 |
| 5,797,020 A | * | 8/1998 | Bonella et al. | 710/240 |
| 5,828,865 A | * | 10/1998 | Bell | 703/27 |
| 5,832,241 A | * | 11/1998 | Guy et al. | 710/112 |
| 5,850,530 A | * | 12/1998 | Chen et al. | 710/113 |
| 5,870,567 A | * | 2/1999 | Hausauer et al. | 710/112 |
| 5,872,941 A | * | 2/1999 | Goodrum et al. | 370/401 |
| 5,878,237 A | * | 3/1999 | Olarig | 710/309 |
| 5,884,027 A | * | 3/1999 | Garbus et al. | 370/402 |
| 5,905,877 A | * | 5/1999 | Guthrie et al. | 710/112 |
| 5,987,555 A | * | 11/1999 | Alzien et al. | 370/402 |
| 6,026,455 A | * | 2/2000 | Shah et al. | 710/100 |
| 6,070,209 A | * | 5/2000 | Hausauer | 710/104 |
| 6,138,192 A | * | 10/2000 | Hausauer | 710/100 |
| 6,199,131 B1 | * | 3/2001 | Melo et al. | 710/107 |
| 6,247,086 B1 | * | 6/2001 | Allingham | 710/314 |
| 6,292,865 B1 | * | 9/2001 | McTague et al. | 710/262 |
| 6,298,407 B1 | * | 10/2001 | Davis et al. | 710/52 |
| 2001/0021967 A1 | * | 9/2001 | Tetrick | 711/163 |

OTHER PUBLICATIONS

PCI Specification Interest Group, PCI Local Bus Specification, Revision 2.2, pp. i–xx, 1–302, Dec. 18, 1998.

* cited by examiner

Primary Examiner—Sumati Lefkowitz
(74) Attorney, Agent, or Firm—Trop, Pruner&Hu, P.C.

(57) ABSTRACT

A method to operate a computer system bridge circuit includes enqueueing multiple delayed read requests to system memory, where each delayed read request is associated with a different expansion bus devices. The method may also include forwarding a second enqueued read request to the system memory before receiving a response to a first forwarded enqueued read request. The method may further include arbitrating to an expansion bus device (having an enqueued delayed read request) only after read data is received from the system memory in response to a forwarded read request. A computer system incorporating a bridge circuit operated in accordance with the described method is also described.

16 Claims, 3 Drawing Sheets

BUS TO SYSTEM MEMORY DELAYED READ PROCESSING

BACKGROUND

The invention relates generally to computer systems, and more particularly to techniques for improving peripheral device to main memory throughput using a delayed read pipeline.

Personal computer (PC) systems generally employ an expansion bus to handle various data transactions related to input-output devices such as magnetic and/or optical mass storage units and network interface controllers. Typically, expansion buses are coupled to the system bus (to which one or more processors/central processing units are connected) by a bridge circuit.

In the past, many PCs employed an expansion bus operated in conformance with the Industry Standard Architecture (ISA) standard. The ISA standard defines a 16-bit bus having a maximum transfer rate of 8.33 MBytes/sec. The subsequently defined extended ISA (EISA) bus uses a 32-bit data path to provide a peak transfer rate of 33 MBytes/sec—four times that of the ISA bus. As the operating speed of system components continues to increase, however, ISA, EISA and their descendant bus standards (e.g., the Micro Channel and VESA bus standards) have been unable to provide the necessary operational bandwidth.

One solution to the low bandwidth capacity of earlier expansion bus architectures is embodied in the Peripheral Component Interconnect (PCI) standard. The PCI standard defines both 32-bit and 64-bit data transfer protocols operating at either 33 MHz or 64 MHz. A key feature of the PCI standard is that it supports burst operations on a transaction by transaction basis, where the length of each burst may be negotiated between the device initiating the transfer (a master) and the device receiving the transfer request (a target). As a result, expansion buses operated in conformance with the PCI specification support transfer rates of 132 MBytes/sec for a 32-bit bus operating at 33 MHz, 264 MBytes/sec for a 32-bit bus operating at 66 MHz or a 64-bit bus operating at 33 MHz, and 528 MBytes/sec for a 64-bit bus operating at 66 MHz. (The current version of the PCI specification (rev. 2.2) is available from the PCI Special Interest Group, 2575 NE. Kathryn Street #17, Hillsboro, Oreg. 97124.)

While expansion bus operating speeds have continued to increase, many target devices are still not able to respond to master initiated data requests in a timely fashion (i.e., within the bus required latency period). In computer systems employing ISA and EISA expansion buses, for example, the delay in reading data from a slow target device was handled by wait states. That is, when a target (e.g., system memory) could not immediately provide the data requested by a master (e.g., a processor), the target simply marked time using wait states until the data became available. The use of wait states in this manner prevents another device from accessing the bus. Thus, expansion bus bandwidth was effectively limited by the slowest responding device on the bus. To avoid the use of wait states, the PCI standard allows the use of delayed transactions. In a delayed transaction data requests are temporally separated from the delivery of the requested data by other transactions. Wait states are not used—while the originating master waits for the target device to provide the requested information, other bus masters are allowed to use the bus. In accordance with the PCI specification, a delayed transaction progresses to completion in three phases: (1) request by master; (2) completion of the request by the target; and (3) completion of the transaction by the master.

During phase one, the master generates a transaction on the bus while the target decodes the address, latches the information required to complete the access and terminates the request with a Retry. ("Retry" refers to the condition where a target device issues a transaction termination request before any data is transferred. This condition may occur, for example, because the target device is unable to meet the bus latency requirement, is currently locked by another master, or there is a conflict for a internal resource. Target devices indicate Retry by asserting STOP# and not asserting TRDY# on the initial data phase of a transaction.) The latched request information is referred to as a Delayed Request. The master initiating the Retried transaction must reissue its request until the request completes.

During phase two, the target independently completes the request using the latched information from the Delayed Request. If the Delayed Request corresponds to a read operation, the target obtains the requested read data and completion status. If the Delayed Request corresponds to a write transaction, the target delivers the write data and obtains the completion status. The result of completing the Delayed Request produces a Delayed Completion (consisting of the latched information of the Delay Request, the completion status and, possibly, data). The target stores the Delayed Completion until the master repeats its initial request.

During phase three, the master successfully rearbitrates for the bus and reissues the original request. The target decodes the request and gives the master the completion status (and data if the transaction is a read transaction). At this point, the Delayed Completion is retired and the transaction has completed.

In accordance with conventional PCI bus to system memory control devices (e.g., the 440GX chip from Intel Corporation), only a single PCI device to system memory delayed read transaction may be accepted for processing at a time. Thus, each delayed read by a PCI device to system memory incurs the full memory access latency. Thus, it would be beneficial to provide a mechanism to reduce the read latency (thereby improving bandwidth utilization of the PCI bus) associated with PCI device to system memory read operations.

SUMMARY

In one embodiment the invention provides a method to operate a computer system bridge circuit. The method includes enqueueing multiple delayed read requests to system memory, wherein each delayed read request is associated with a different expansion bus devices. The method may also include forwarding a second enqueued read request to the system memory before receiving a response to a first forwarded enqueued read request. The method may further include arbitrating to an expansion bus device (having an enqueued delayed read request) only after read data is received from the system memory in response to a forwarded read request.

In another embodiment, the invention provides a computer system including a system memory, an expansion bus, a plurality of devices coupled to the expansion bus, and a bridge circuit having a queue and a control circuit. The control circuit is adapted to enqueue a plurality of delayed read requests to the system memory from the expansion bus devices (each enqueued delayed read request being associated with a different expansion bus device). The control circuit may be further adapted to transmit a plurality of read requests to the system memory (each read request corresponding to an enqueued delayed read request), and to receive read data from the system memory in response to the transmitted read requests. The bridge circuit may further include an arbiter circuit adapted to arbitrate to that expansion bus device associated with that delayed read request for which the read data was received only after the read data is received from system memory.

DETAILED DESCRIPTION

Techniques to reduce the read latency associated with Peripheral Component Interconnect (PCI) device to system memory read operations are described. The following embodiments, described in conjunction with the above described figures, are illustrative only and are not to be considered limiting in any respect.

Figure 1:
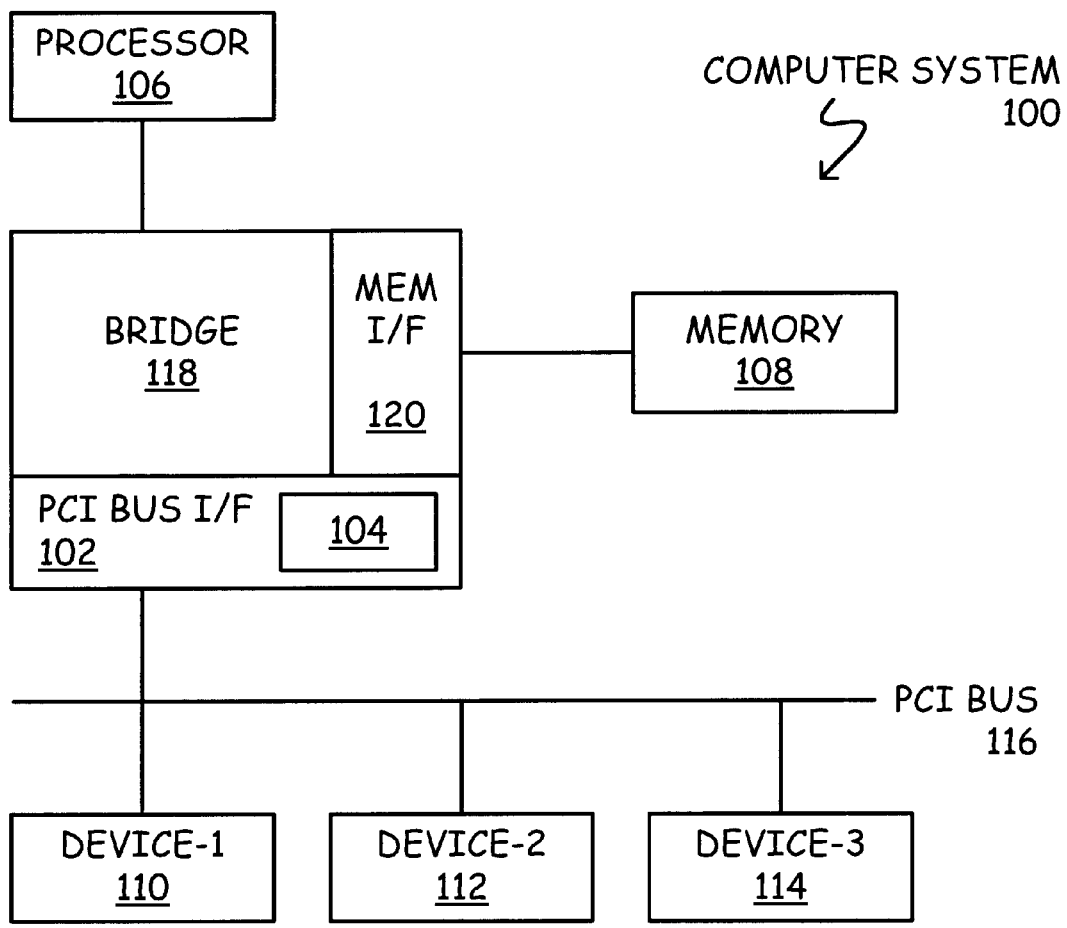
FIG. 1 shows a block diagram of a computer system incorporating a delayed read request queue in accordance with one embodiment of the invention.

Referring to FIG. 1, computer system 100 having PCI bus interface 102 incorporating delayed read queue 104 in accordance with one embodiment of the invention is shown. Illustrative computer system 100 also includes one or more host processors (only one is shown for convenience, 106), system memory 108, a plurality of PCI devices (e.g., 110, 112 and 114) coupled to PCI bus 116, and bridge circuit 118. Bridge circuit 118, in turn, incorporates memory interface circuit 120 and the aforementioned PCI bus interface circuit 102 and delayed read queue 104. Illustrative processors (e.g., processor 106) include the PENTIUM processor from Intel Corporation and the AMD-K6 processor from Advanced Micro Devices Corporation. An illustrative system memory 108 comprises dynamic random access memory (DRAM) such as static DRAM or double data rate DRAM. Illustrative PCI devices (e.g., devices 110, 112 and 114) include network control adapters, audio control adapters, video control adapters, small computer system interface (SCSI) control adapters, and graphics control adapters.

Delayed read queue 104 provides a structure through which a delayed read transaction pipeline (from PCI bus 116 to system memory 108) may be implemented. Delayed read queue 104 allows PCI interface 102 to accept multiple, simultaneously pending read requests from PCI bus devices (e.g., devices 110, 112 and 114) targeting system memory 108. Each accepted delayed request may be forwarded to system memory 108 (via memory interface 120) in turn. The ability to store multiple delayed read requests allows PCI interface 102 to submit subsequent delayed read requests to memory interface 120 before receiving the read data associated with a previously submitted read request.

Figure 2:
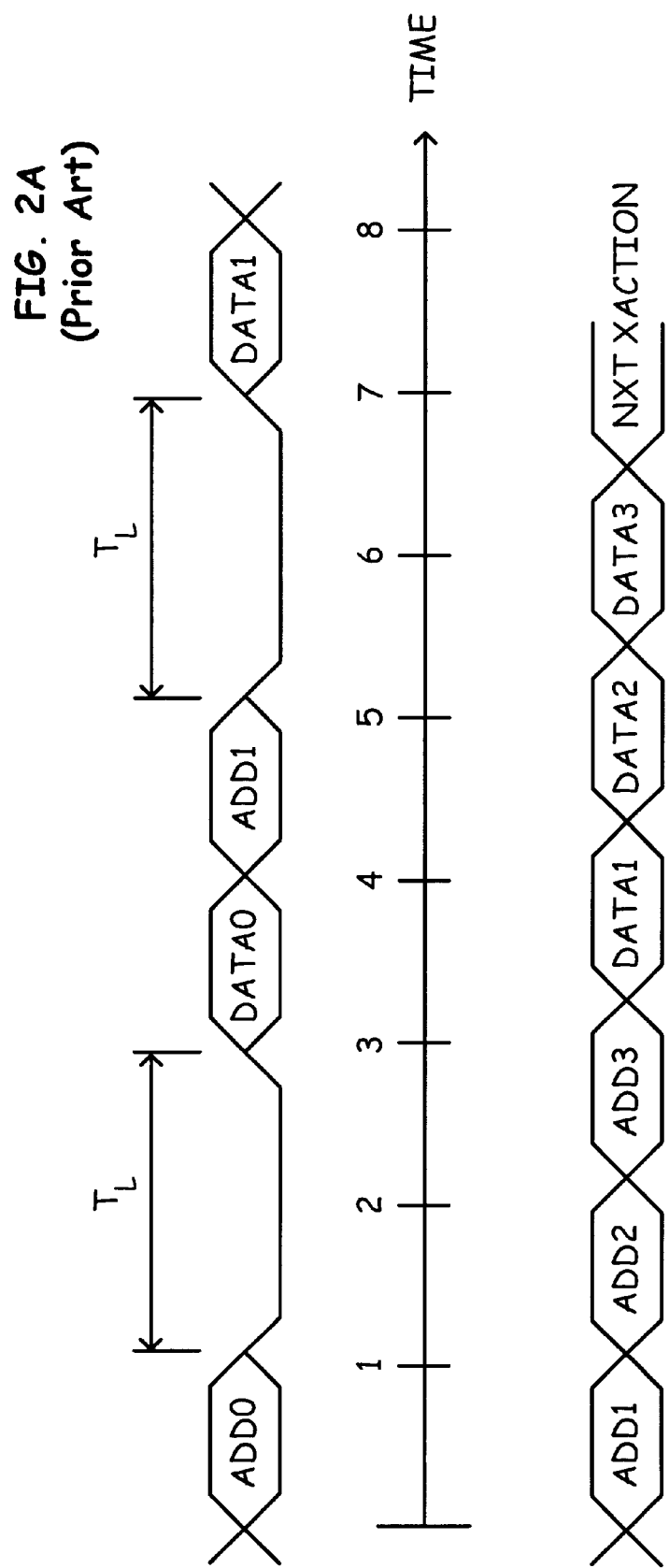
FIG. 2A shows how a conventional peripheral component interconnect (PCI) interface processes one delayed read request at a time.
FIG. 2B shows how a PCI interface in accordance with the invention overlaps (pipelines) the processing of multiple delayed read requests at once.

This benefit may be readily understood by comparing the latency associated with processing delayed read requests in a conventional PCI bus interface (i.e., one not using a delayed read queue) with that of a PCI interface incorporating a delayed read queue in accordance with the invention. As shown in FIG. 2A, conventional PCI interface circuits can only initiate the processing of one delayed read request at a time. As a result, each delayed read transaction suffers the full read latency ($T_L$) of system memory. In contrast, a PCI bus interface incorporating delayed read queue 104 may initiate prefetch operations for as many delayed read requests to system memory 108 as memory interface 120 is capable of handling (see FIG. 2B). For example, if a prior art PCI bus interface takes eight time units to complete two delayed read transactions (see FIG. 2A), three delayed read transactions may be completed and a fourth begun in the same eight time units (see FIG. 2B). Pipelining delayed read requests in this manner "hides" much of the latency inherent in each memory access. The reduced read latency may contribute significantly to the improved performance of PCI bus devices.

In one embodiment, delayed read queue 104 is sufficiently deep (i.e., has sufficient storage) to allow at least N simultaneously pending delayed read requests, where N is chosen to so that read data is likely to be received from system memory (in response to a first submitted delayed request) before all delayed completions are submitted. As shown in FIG. 2B, the ability to queue and submit multiple delayed requests to system memory 108 in accordance with the invention substantially reduces the effective read latency associated with all delayed requests (except the first) which has the effect of increasing the effective PCI bus to system memory bandwidth.

Figure 3:
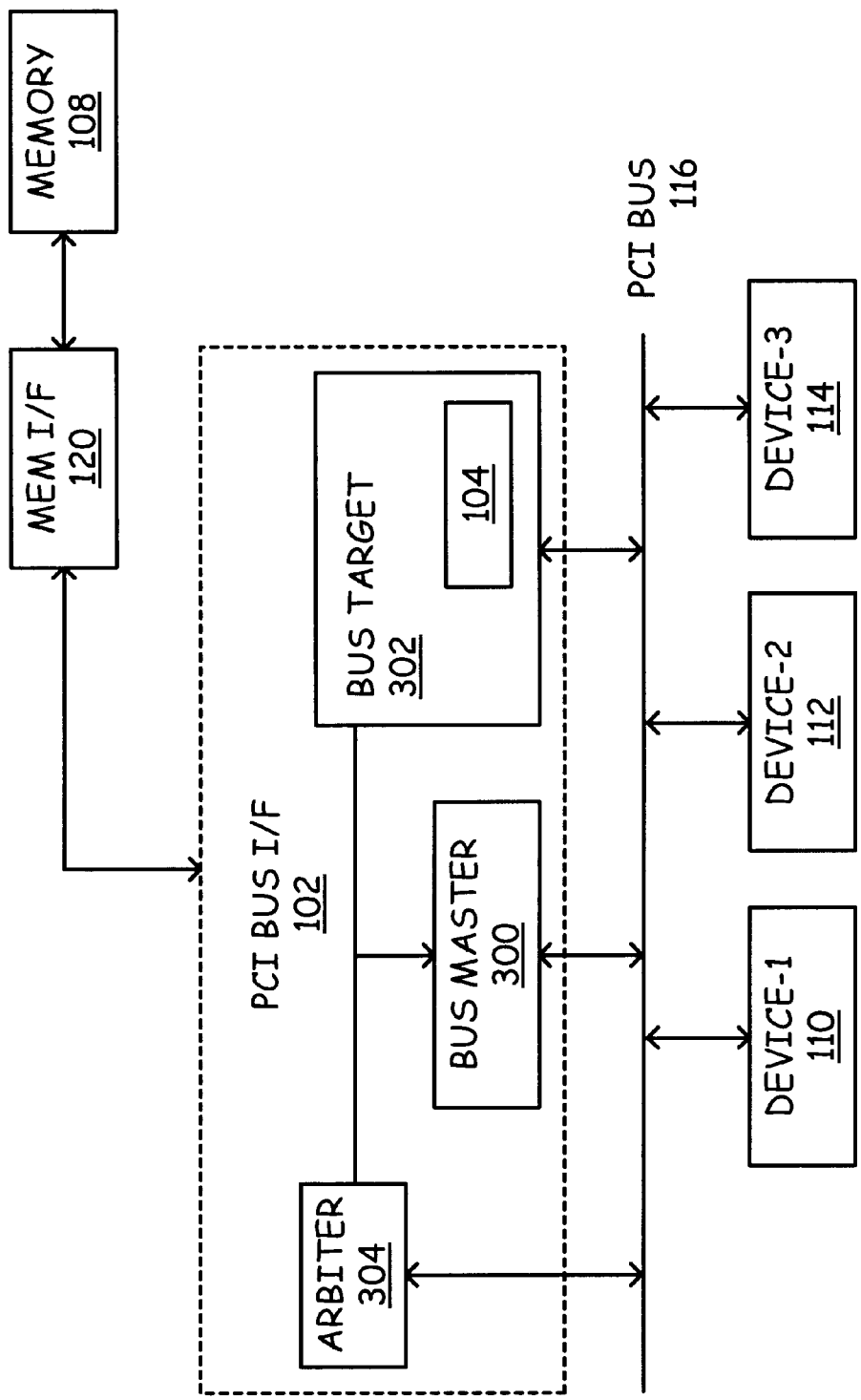
FIG. 3 shows an expanded block diagram of the PCI interface of FIG. 1.

Referring now to FIG. 3, an expanded block diagram of PCI bus interface 102 is shown. As indicated, PCI bus interface 102 includes a bus master circuit 300, a bus target circuit 302 and an arbiter circuit 304. Bus master circuit 300 is responsible for initiating transactions on PCI bus 116. Bus target circuit 302 is responsible for processing transactions initiated by PCI bus masters (e.g., device 110). Because bus target circuit 302 mediates communication between a bus device and system memory 108, it includes delayed read queue 104. Arbiter circuit 304 selectively grants access to PCI bus 116 to one device at a time (e.g., bus master circuit 300, bus target circuit 302, or a bus device).

Bus target circuit 302 incorporates that circuitry needed to perform conventional bus target functions (as required by the PCI specification). In addition, bus target circuit 302 includes the necessary control circuitry to enqueue delayed read requests into queue 104 from PCI bus 116, forward delayed read requests to memory interface 120, identify read data received from memory interface 120 as being associated with a pending delayed read, and return received read data to the appropriate bus device. To satisfy PCI transaction ordering requirements, bus target 302 should also be capable of accepting and processing a system memory write transaction from a bus device while there are pending delayed read requests. Implementation of these functions, while complex, would be a routine undertaking for one of ordinary skill in the art of PCI interface and/or computer system bridge circuit design having the benefit of this disclosure.

In one embodiment, arbiter 304 selectively enables (arbitrates) to PCI bus devices in a cyclic or round-robin fashion. In another embodiment, arbiter 304 does not arbitrate to a PCI bus device having an enqueued delayed read request in queue 104. This latter technique may avoid wasting PCI bus cycles by ignoring those devices which would only initiate a retry operation. In yet another embodiment, arbiter 304 immediately arbitrates to a device whose delayed read transaction is ready to complete (that is, on receipt of read data from system memory 108).

Various changes in the materials, components and circuit elements of the described embodiments are possible without departing from the scope of the claims. For instance, delayed read queue 104 may be incorporated within PCI interface 102 as shown in FIGS. 1 and 3 or it may be incorporated within memory interface 120 (as part of a memory control circuit). Further, PCI bus interface 102 (and its constituent elements, see FIGS. 1 and 3) may be implemented as a custom designed state machine (or part thereof) comprising discrete logic, integrated circuits, or specially designed application specific integrated circuits (ASICs).

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A method to operate a computer system bridge circuit comprising:
   enqueueing a plurality of delayed read requests, wherein each read request is associated with a peripheral component interconnect device;
   retrieving data, by a memory interface in the bridge circuit, from system memory in response to the delayed read requests; and
   performing arbitration, by an arbiter, of a subsequent request from one of the plurality of peripheral component interconnect devices in response to determining that data for enqueued delayed read request of the one peripheral component interconnect device has been retrieved by the memory interface from the system memory, but not performing arbitration, by the arbiter, of the subsequent request received by the arbiter from the one peripheral component interconnect device in response to determining that data for the enqueued delayed read request of the one peripheral component interconnect device has not been retrieved by the memory interface from the system memory.

2. The method of claim 1, further comprising performing arbitration, by the arbiter, of said plurality of peripheral component interconnect devices in a round-robin fashion.

3. The method of claim 1, further comprising sending retry indications to respective peripheral component interconnect devices.

4. A computer system comprising:
   a system memory;
   a bus;
   a plurality of devices coupled to the bus; and
   a bridge circuit coupled to the system memory and the bus, the bridge circuit having storage;
      a control circuit adapted to enqueue a plurality of system memory read requests into the storage, wherein each enqueued system memory read request is associated with a different bus device,
      the control circuit to issue retry indications to the bus devices;
      a memory interface to retrieve data from the system memory in response to the enqueued system memory read requests; and
      an arbiter to arbitrate a subsequent request of one of the bus devices in response to determining that data has been retrieved by the memory interface from system memory for the enqueued read request of the one bus device, but the arbiter to not arbitrate the subsequent request, received by the arbiter, of the one bus device in response to determining that data has not been retrieved by the memory interface from system memory for the enqueued read request.

5. The computer system of claim 4, wherein the storage comprises memory configured as a first-in first-out queue.

6. The computer system of claim 4, wherein the bus comprises a bus in conformance with the peripheral component interconnect standard.

7. The computer system of claim 4, wherein the bridge circuit comprises an application specific integrated circuit.

8. A method for use in a computer system having a bus, a system memory, and a bridge circuit having a memory interface connected to the system memory, the method comprising:
   receiving a first read request from a first bus device and a second read request from a second bus device;
   sending retry indications to the first and second bus devices;
   retrieving data, by the memory interface, from the system memory for the first and second read requests; and
   performing arbitration by an arbiter of a subsequent request from one of the first and second bus devices in response to determining that data for the corresponding one of the first and second read requests has been retrieved from the system memory by the memory interface, and
   not performing arbitration by the arbiter of the subsequent request, received by the arbiter, in response to determining that data for the corresponding one of the first and second read requests has not been retrieved from the system memory by the memory interface.

9. The method of claim 8, further comprising performing arbitration, by the arbiter, of a plurality of bus devices, including the first and second bus devices, in a round-robin fashion.

10. The method of claim 8, wherein receiving the first and second read requests comprises receiving first and second delayed read requests.

11. A method comprising:
    enqueuing, in a bridge circuit, a plurality of delayed read requests, wherein each delayed read request is associated with one of a plurality of bus devices;
    retrieving data, by the bridge circuit, from memory in response to the delayed read requests; and
    performing arbitration, by an arbiter, of a subsequent read request of one of the plurality of bus devices received after the plurality of enqueued delayed read requests in response to determining that data for the enqueued delayed read request of the one bus device has been retrieved from the memory, and
    not performing arbitration, by the arbiter, of the subsequent read request received by the arbiter from the one bus device in response to determining that data for the enqueued delayed read request of the one bus device has not been retrieved from the memory.

12. The method of claim 11, wherein enqueuing the plurality of delayed read requests comprises enqueuing a plurality of peripheral component interconnect delayed read requests.

13. The method of claim 11, further comprising sending, by the bridge circuit, retry requests to respective bus devices for respective enqueued delayed read requests.

14. A system comprising:
    a memory;

a bus;

a plurality of bus devices coupled to the bus;

a bridge circuit coupled to the memory and the bus, the bridge circuit comprising:

a control circuit to enqueue a plurality of delayed read requests from respective bus devices;

a memory interface to retrieve data from the memory in response to the enqueued delayed read requests; and an arbiter to arbitrate a subsequent read request of one of the plurality of bus devices received after the plurality of enqueued delayed read requests in response to determining that data for the enqueued delayed read request of the one bus device has been retrieved from the memory, and the arbiter to not arbitrate the subsequent read request received by the arbiter from the one bus device in response to determining that data for the enqueued delayed read request of the one bus device has not been retrieved from the memory.

15. The system of claim 14, wherein the delayed read requests comprise peripheral component interconnect delayed read requests.

16. The system of claim 14, the control circuit to further send retry requests to respective bus devices for respective enqueued delayed read requests.

* * * * *